US012668238B2

(12) United States Patent
Yamauchi et al.

(10) Patent No.: US 12,668,238 B2
(45) Date of Patent: Jun. 30, 2026

(54) COLLISION DETERMINATION APPARATUS, COLLISION DETERMINATION METHOD, COLLISION AVOIDANCE SYSTEM

(71) Applicant: DENSO CORPORATION, Kariya-city (JP)

(72) Inventors: Takuma Yamauchi, Kariya-city (JP); Kei Kamiya, Kariya-city (JP); Takaharu Oguri, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 212 days.

(21) Appl. No.: 18/166,385

(22) Filed: Feb. 8, 2023

(65) Prior Publication Data

US 2023/0182728 A1 Jun. 15, 2023

Related U.S. Application Data

(63) Continuation of application No. PCT/JP2021/026969, filed on Jul. 19, 2021.

(30) Foreign Application Priority Data

Aug. 11, 2020 (JP) ................................. 2020-135606

(51) Int. Cl.
*B60W 30/095* (2012.01)
*B60W 30/09* (2012.01)

(52) U.S. Cl.
CPC ........ *B60W 30/0956* (2013.01); *B60W 30/09* (2013.01); *B60W 2554/402* (2020.02); *B60W*

*2554/4041* (2020.02); *B60W 2554/4044* (2020.02); *B60W 2554/80* (2020.02)

(58) Field of Classification Search
CPC ............. B60W 30/09; B60W 30/0956; B60W 2554/402; B60W 2554/4041; B60W 2554/4044; B60W 2554/80
See application file for complete search history.

(56) References Cited

U.S. PATENT DOCUMENTS

| | | | | |
|---|---|---|---|---|
| 10,843,691 | B2 * | 11/2020 | Stobbe | H04W 4/44 |
| 2012/0182155 | A1 * | 7/2012 | Sato | F16P 3/142 |
| | | | | 901/1 |
| 2014/0343750 | A1 * | 11/2014 | Minemura | B60W 50/04 |
| | | | | 701/1 |
| 2016/0313738 | A1 | 10/2016 | Kindo et al. | |
| 2018/0178790 | A1 * | 6/2018 | Oguri | G08G 1/166 |
| 2018/0370531 | A1 | 12/2018 | Matsunaga | |
| 2019/0344740 | A1 * | 11/2019 | Hakki | B60R 21/0132 |
| 2021/0114590 | A1 | 4/2021 | Matsunaga | |

FOREIGN PATENT DOCUMENTS

| | | | | |
|---|---|---|---|---|
| DE | 102009035072 A1 * | 2/2011 | ............. | G08G 1/161 |
| JP | 2014-006123 A | 1/2014 | | |

* cited by examiner

*Primary Examiner* — Adnan M Mirza
(74) *Attorney, Agent, or Firm* — Precision Patents, P.C.

(57) ABSTRACT

A collision determination apparatus is provided. The collision determination apparatus is provided with an acquiring unit that acquires a posture and movement characteristics of an object to be determined whether a collision risk is present; and a reliability determination unit that determines a reliability of the movement characteristics using the posture and the movement characteristics acquired by the acquiring unit.

5 Claims, 7 Drawing Sheets

COLLISION DETERMINATION APPARATUS, COLLISION DETERMINATION METHOD, COLLISION AVOIDANCE SYSTEM

CROSS-REFERENCE OF RELATED APPLICATIONS

This application is the U.S. bypass application of International Application No. PCT/JP2021/026969 filed on Jul. 19, 2021, which designated the U.S. and claims priority to Japanese Patent Application No. 2020-135606 filed on Aug. 11, 2020, the contents of both of which are incorporated herein by reference.

BACKGROUND

Technical Field

The present disclosure relates to a technique used in a vehicle for determining a collision with an object.

Description of the Related Art

A technique is proposed in which a travelling route of an object is calculated and it is determined whether a route intersection is present between a travelling route of the own vehicle and the travelling route of the object and whether a collision risk between the own vehicle and the object is present.

SUMMARY

The present disclosure may be accomplished with the following aspects.

As a first aspect, a collision determination apparatus is provided. The collision determination apparatus according to the first aspect is provided with an acquiring unit that acquires movement characteristics of an object to be determined whether a collision risk is present; and a reliability determination unit that calculates a movement locus of the object using the acquired movement characteristics and determines a reliability of the calculated movement locus of the object.

BRIEF DESCRIPTION OF THE DRAWINGS

The foregoing and other objects, features, and advantages of the present disclosure will be more clarified by the following detailed descriptions with reference to the accompanying drawings. In the drawings.

DETAILED DESCRIPTION OF THE PREFERRED EMBODIMENTS

Patent literature JP-A-2020-008288A discloses a technique in which a travelling route of an object is calculated and it is determined whether a route intersection is present between a travelling route of the own vehicle and the travelling route of the object and whether a collision risk between the own vehicle and the object is present.

However, detection units generally include individual differences and also detection errors possibly occur due to a disturbance depending on a detection environment. Due to the individual differences between detection units and the detection errors, if an error on the travelling route of the object is large, an accuracy for determining whether a route intersection is present between the own vehicle and the object, that is, an accuracy for determining whether a collision risk between the own vehicle and the object is present may be lowered.

Hence, influence of individual difference of the detection units and environmental influence is required to be suppressed or eliminated to improve the accuracy of the collision determination.

Hereinafter, a collision determination apparatus and a collision determination method according to the present disclosure will be described with the following embodiments.

First Embodiment

Figure 1:
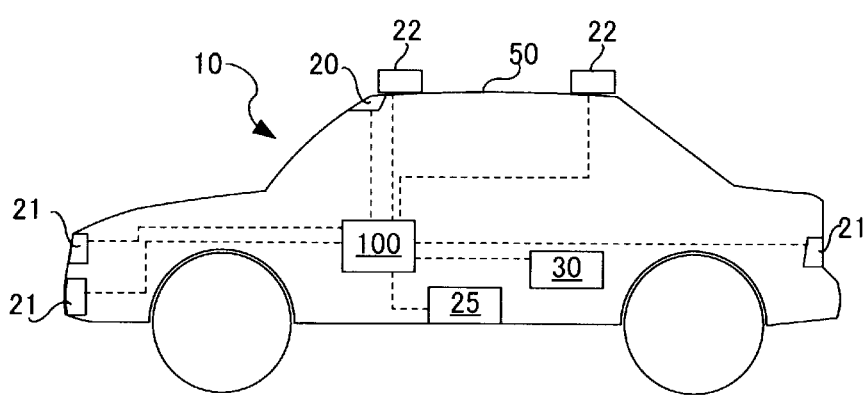
FIG. 1 is an explanatory diagram showing an example of a vehicle on which a collision determination apparatus according to a first embodiment is provided.
Figure 2:
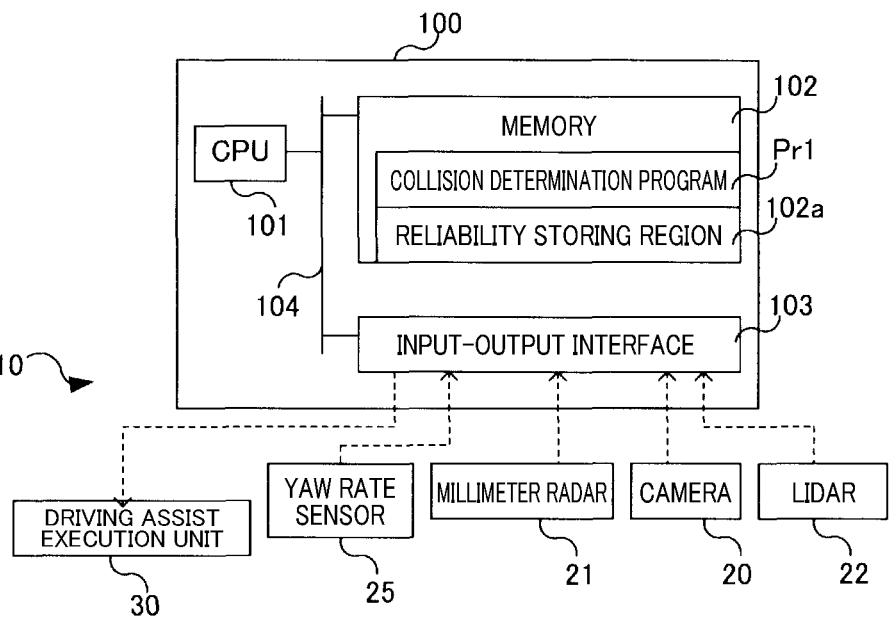
FIG. 2 is a block diagram showing an example of an internal configuration of the collision determination apparatus according to the first embodiment.

As shown in FIG. 1, a collision determination apparatus 100 according to a first embodiment is used being mounted on a vehicle 50. Note that the collision determination apparatus 100 may be used being mounted on two-wheel vehicle or other mobile body other than the vehicle 50. The collision determination apparatus 100 according to the first embodiment constitutes a collision determination system together with a camera 20, a millimeter wave radar 21 and a LIDAR (light detection and ranging) 22. The camera 20 is configured as an imaging device provided with an imaging element such as CCD or an imaging element array and serves as a detection unit that outputs an image data as a detection result including an outline information and a shape information of an object which are detected when receiving visible light. The camera 20 may be disposed on front and rear windows of the vehicle 50 and a side surface of a body of the vehicle 50. The millimeter wave radar 21 is configured to emit millimeter waves and receive reflection waves reflected at an object, thereby serving as a detection unit to detect a distance, an angle and a speed of the object relative to the collision determination apparatus 100, that is, the vehicle 50. The reflection waves reflected at the object are detected as one or more detection point groups corresponding to the object. The millimeter wave radar 21 may be disposed on front and rear bumpers of the vehicle 50, front and rear grilles 16, and front and rear windows. The LIDAR 22 is configured to emit infrared laser light and receive reflection light reflected at the object, thereby serving as a detection unit to detect a distance, an angle and a speed of the object relative to the collision determination apparatus 100, that is, the vehicle 50. The reflection light reflected at the object are detected as detection point groups corresponding to the object. The LIDAR 22 may be disposed on front and rear bumpers of the vehicle 50, front and rear grilles 16, and front and rear windows. The camera 30, the millimeter wave radar 21 and the LIDAR 22 can be collectively referred to as a detection unit to detect environmental information around the vehicle 50. Note that positions where the detection unit is disposed are examples, and the detection units 20, 21 and 22 may be disposed at various other positions in the vehicle 50.

The vehicle 40 is further provided with a yaw rate sensor 25 for detecting a posture of the vehicle 50, more specifically, a yaw rate as an angular velocity when the vehicle 50 is turning right or left. Moreover, the vehicle 50 is provided with a driving assist control execution unit 30 that executes a driving assist such as a braking assist, a steering assist and a driving assist using information about the objects around the vehicle 50 transmitted from the detection units 20, 21 and 22. The collision determination apparatus 100 and the driving assist control execution unit 30, or the collision determination system and the driving assist control execution unit 30 constitute a collision avoidance system 10.

As shown in FIG. 20, the collision determination apparatus 100 is provided with a central processing unit (CPU) 101, a memory 102 as a storage unit, an input-output interface 103 as an acquiring unit and a clock generator which is not shown. The CPU 101, the memory 102, the input-output interface 103 and the clock generator are connected to be bi-directionally communicable with each other via an internal bus 104. The memory unit 102 includes a non-volatile read only memory such as ROM storing a collision determination program Pr1, and a memory unit such as RAM which is readable and writable by the CPU 101. The collision determination program Pr1 determines whether a collision risk with an object is present, including a process for acquiring a direction of speed or a movement locus of the object by using a detected posture and movement characteristics to determine a reliability of the speed and the movement locus and a process for determining a reliability of the speed by using the speed difference acquired from a plurality of detection units. For the memory 102, a non-volatile and read only dedicated region includes a reliability storing region 102a storing a reference reliability as a predetermined reference value and a reliability lower than the reference reliability which can be updated depending on determination of the reliability. The memory may additionally store a predetermined angle difference and a predetermined speed difference used for determining the reliability. The CPU 101, that is, the collision determination apparatus 100 loads the collision determination program Pr1 stored in the memory 102 into the readable and writable memory and executes the loaded program, thereby serving as a reliability determination unit and a determination unit. Note that the CPU 101 may be a single CPU or a plurality of CPUs that execute respective programs, or may be a multi-task CPU or a multithread CPU capable of simultaneously executing a plurality of programs. The memory 102 may further store, for example, a driving assist program for executing driving assist processes or an autonomous driving process using a detection result of objects. According to the present embodiment, a collision avoidance assist process is mainly executed among the driving assist processes. Note that the driving assist control execution unit 30 can be referred to as a collision avoidance assist execution unit.

A camera 20, the millimeter wave radar 21 and the LIDAR 21 as detection units for detecting objects, the yaw rate sensor 25 and the driving assist control execution unit 30 are each connected to the input-output interface 103 via a control signal line. An image control signal is transmitted to the camera 20 from the input-output interface 103 to command the camera 20 to perform an imaging process to detect objects, and an imaging signal indicating a captured signal as a detection result is transmitted to the input-output interface 103 from the camera 20. A detection control signal is transmitted to the millimeter wave radar 21 from the input-output interface 103 to command the millimeter wave radar 21 to emit detection waves and receive the incoming waves to detect objects, and a distance signal and an angle signal as detection result or an incoming wave intensity signal as a raw data is transmitted to the input-output interface 103 from the millimeter wave radar 21. A detection control signal is transmitted to the LIDAR 22 from the input-output interface 103 to command the LIDAR 22 to perform emission and reception processes to detect objects, and a distance signal and an angle signal as detection result or an incoming wave intensity signal as a raw data is transmitted to the input-output interface 103 from the LIDAR 22. A command signal is transmitted to the driving assist control execution unit 30 from the input-output interface 103 to command the driving assist control execution unit 30 to perform a driving assist control depending on the detection result of the objects.

Figure 3:
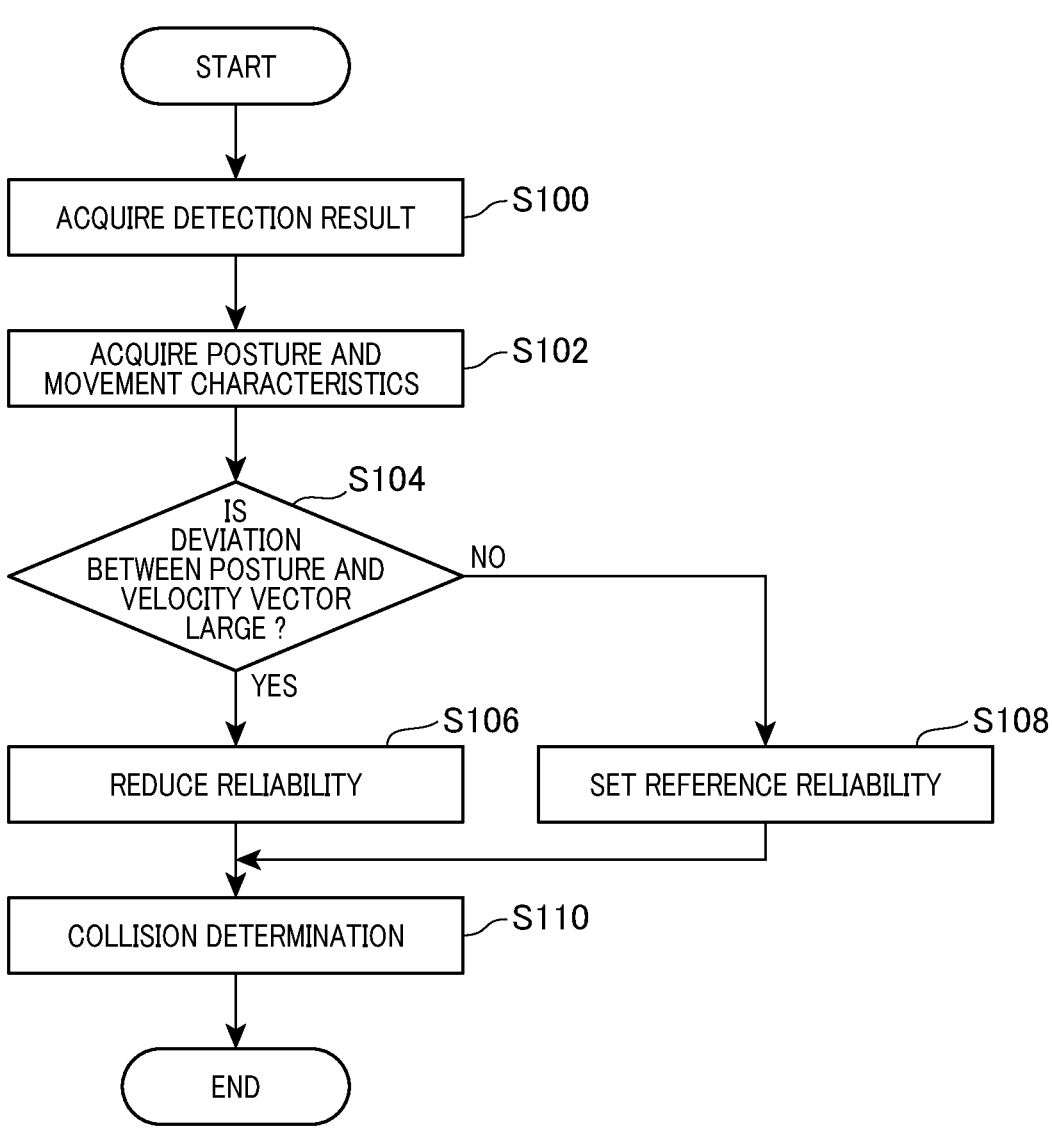
FIG. 3 is a flowchart showing a collision determination process executed by the collision determination apparatus according to the first embodiment.

With reference to FIG. 3, a collision determination process executed by the collision determination apparatus 100 will be described. The processing routine shown in FIG. 3 is repeatedly executed at predetermined intervals, for example, every few milliseconds, after the control system of the vehicle 50 is activated or a start switch is turned ON. The CPU 101 executes the collision determination program Pr1, thereby executing the process flow shown in FIG. 3. In the following description, a case will be exemplified in which the camera 20 and the millimeter wave radar 21 are used as detection units. However, detection units based on other detection method such as the LIDAR 22 or an ultrasonic wave sensor may be appropriately combined. In the present embodiment, a case will be exemplified in which other vehicle is used as an object Ta having a posture with respect to the vehicle 50 provided with the collision determination apparatus 100 shown in FIGS. 4 and 5. The object Ta may include movable objects such as a bicycle, a motorcycle, a pedestrian, and an animal.

The CPU 101 acquires detection result of the object Ta, as an object to be determined whether a collision risk is present, detected by the camera 20 and the millimeter wave radar 21 via the input-output interface 103 (step S100). The detection result includes, for the camera 20, a captured image showing a shape and a location of the object Ta. The detection result includes, for the millimeter wave radar 21, detection point group corresponding to the object Ta and the distance and angle information of the respective detection points. The object Ta is recognized by performing a pattern matching to the image captured by the camera 20, and is recognized by executing the clustering process using the detection point group acquired by the millimeter wave radar 21.

Figure 4:
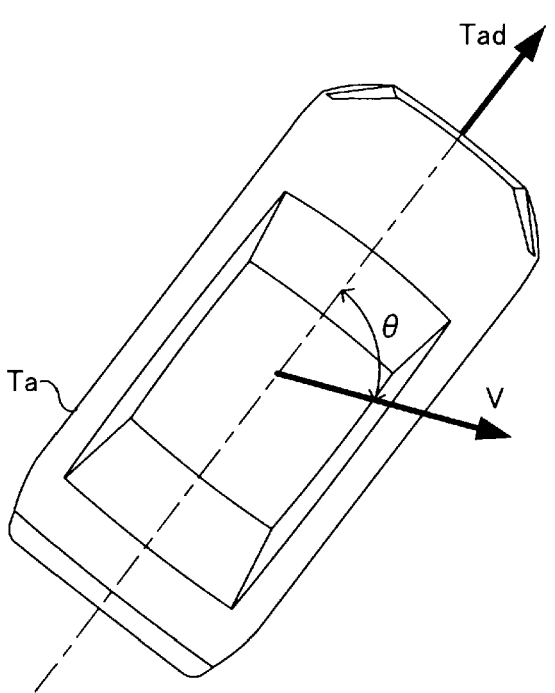
FIG. 4 is an explanatory diagram showing a procedure of determining a reliability by using a posture and a direction of a speed of an object.

The CPU 101 acquires a posture and movement characteristics of the object Ta using the acquired detection result (step S102). The movement characteristics refers to information expressing features of the operation or the behavior of the object Ta over time. According to the present embodiment, the movement characteristics may refer to a velocity vector V of the object Ta, a movement speed or a movement direction indicating showing a speed and direction in which the object Ta moves. For the posture of the object Ta, as shown in FIG. 4, a major direction Tad corresponding to the longitudinal direction of the object Ta, that is, the travelling direction, is determined by using coordinate information of pixels corresponding to two or more feature points in the object Ta recognized by the pattern matching technique, for example, two or more corner portions, preferably three or more corner portions or four or more feature points, and the posture of the object Ta is acquired as an angle formed between the major direction Tad and a direction orthogonal to the lateral direction in the local coordinate of the vehicle 50 (i.e. travelling direction of the vehicle 50). Alternatively, for the posture of the object Ta, the major direction Tad corresponding to the object Ta may be determined by using coordinate information of a plurality of detection points corresponding to the object Ta recognized by the clustering process of the detection point group, for example, detection points corresponding to two or more corner portions, preferably detection points corresponding to three or more corner portions or four or more detection points, and the posture of the object Ta is acquired as an angle formed between the major direction Tad and the lateral direction of the vehicle 50. The major direction of the object Ta may refer to a movement direction or an orientation of the object Ta. In the case where the object Ta is a pedestrian, since it is not easy to determine the longitudinal direction, the camera 20 may be used to recognize a face of the pedestrian, the direction of the face may be determined to be the major direction. Further, a fusion processing may be executed using the detection results of the camera 20 and the millimeter wave radar 21, and the posture of the object Ta may be acquired using successive fusion-derived points in which the fusion processing is succeeded.

For the velocity vector V of the object Ta, a detection speed as a speed detected by the millimeter wave radar 21, that is, a detection history of the detection speed may be used, or a movement history of the object Ta, that is, a speed history where the positional history of the detection points is differentiated by time may be used. Further, a velocity vector used when calculating the movement locus which will be described later may be utilized. Moreover, both of the detection speed and the speed history may be utilized. In this case, for example, a simple average of both speed values or a weighted average where either one speed value is weighted may be utilized. As shown in FIG. 4, the acquired speed vector V of the object Ta has a direction and a magnitude of the collision determination apparatus 100, that is, in the local coordinate of the vehicle 50.

The CPU 101 determines the posture of the object Ta, that is, determines whether a deviation between the major direction Tad and the velocity vector V is larger than a predetermined determination value (step S104). Specifically, the CPU 101 determines whether an angle θ formed between the major direction Tad as a current direction of the object Ta and the velocity vector at the current position is larger than the determination angle θr, that is, determines whether it is θ>θr. The predetermined angle θr ranges, for example, from 30° to 40° or may range from 20° to 30° for more strict determination, or from 40° to 50° for more relaxed determination.

When determined that it is θ>θr, that is, the deviation between the posture of the object Ta and the velocity vector V is larger than the predetermined determination value (step S104: Yes), the CPU 101 reduces the movement characteristics, that is, the reliability of the speed (step S106). The reliability refers to an accuracy, a validity or a certainty of indexes and parameters to be determined. In this case, since the posture of the object Ta, that is, the deviation between the major direction Tad and the velocity vector is large, and errors may be contained in the acquired posture or the velocity vector V which cannot be tolerated, a movement behavior of the object Ta is not accurately detected according to the detection result of the object Ta acquired by the camera 20 and the millimeter wave radar 21. Hence, the reliability of the speed acquired by using the detection result is low. For the reduction of the reliability, a variable value may be used where a degree of reduction becomes larger in proportion to a deviation angle from the determination angle θr, or a fixed value where a predetermined degree is reduced may be used. The CPU 101 executes the collision determination process (step S110), determines whether a collision risk between the object Ta and the vehicle 50 is present by using the determined reliability, determines the level of the driving assist process, transmits a command signal to the driving assist control execution unit 30 and terminates the present processing routine. For the determination whether a collision risk is present, a known method, for example, TTC (time to collision) or a relative positional relationship in the vehicle width direction is used to determine the collision risk. Then, a threshold value used for a collision determination depending on the determined reliability, for example, TTCr may be changed, whereby a level of determination whether a collision risk is present may be changed. Alternatively, the level of the driving assist process in accordance with the determination result may be determined without changing the level of determination whether a collision risk is present. Specifically, in the case where the reliability is lower than the reference reliability, the collision determination level may be lowered by using a larger TTCr, or the driving assist control execution unit 30 may be commanded to execute a lower level driving assist, that is, a weak driving assist without changing the collision determination level, or both controls may be combined. For example, in the case where a braking assist including an emergency braking is required, the collision determination level is lowered to delay the braking start timing or the driving assist level is set to be lowered to delay the braking start timing, or the braking force is weakened.

The CPU 101 sets the reliability to be the reference reliability (step S108) when determined that the deviation between the posture of the object Ta and the velocity vector V is less than or equal to the predetermined determination value (step S104: No). In the case where the deviation between the posture of the object Ta and the velocity vector V is less than or equal to the predetermined determination value, since the posture of the object Ta, that is, the major direction Tad and the direction of the velocity vector V are matched or close to each other to be within an allowable range, according to the detection result of the object Ta acquired by the camera 20 and the millimeter radar 21, the movement behavior of the object Ta is accurately detected. Hence, the reliability of the speed satisfies the reference reliability. The CPU 101 executes a collision determination process (step S110) to determine whether a collision risk between the object Ta and the vehicle 50 is present, determine the level of driving assist in accordance with the determined reliability, or both controls are combined to be executed. Then the CPU 101 transmit a command signal to the driving assist control execution unit 30 and terminates the present process. Specifically, since the reliability is set to be the reference reliability, the process determines whether the collision risk is present based on a determination level as a reference level, and commands the driving assist control execution unit 30 to execute the driving assist process having a predetermined reference level.

According to the above-described collision determination apparatus 100 of the first embodiment, since the posture of the object Ta and the movement characteristics of the object Ta, especially the velocity vector V of the object Ta is utilized to determine the reliability of the movement characteristics, the individual differences of the detection elements and the environmental influence are suppressed or excluded, thereby improving the collision determination accuracy. Specifically, in the case where the angle θ formed between the current major direction Tad and the velocity vector at the current location is larger than the predetermined angle θr, the reliability of the velocity vector V is reduced, and in the case where an angle θ formed between the current major direction Tad and the velocity vector at the current location is smaller than the determination angle θr, it is determined that the velocity vector V satisfies the reference reliability. As a result, even in a case where the individual differences of the detection elements and the environmental influence are present, it can be determined whether a collision risk is present depending on a determination level based on a reliability index. Further, a driving assist level can be set depending on the reliability such that an erroneous determination and execution of unnecessary driving assist process are reduced, thereby improving the collision determination accuracy. Similar to the following embodiments, a collision avoidance assist in the driving assist process includes, in addition to the driving assist, a steering assist for avoiding collision with the object by the steering operation.

Second Embodiment

A collision determination apparatus according to the second embodiment differs from the first embodiment where the velocity vector V of the object V is used in that a movement locus is used as movement characteristics of the object Ta when determining the reliability. Since other configurations of the second embodiment are the same as those in the collision determination apparatus 100 of the first embodiment, the same reference numbers are applied to the same configurations and detailed explanation will be omitted.

Figure 5:
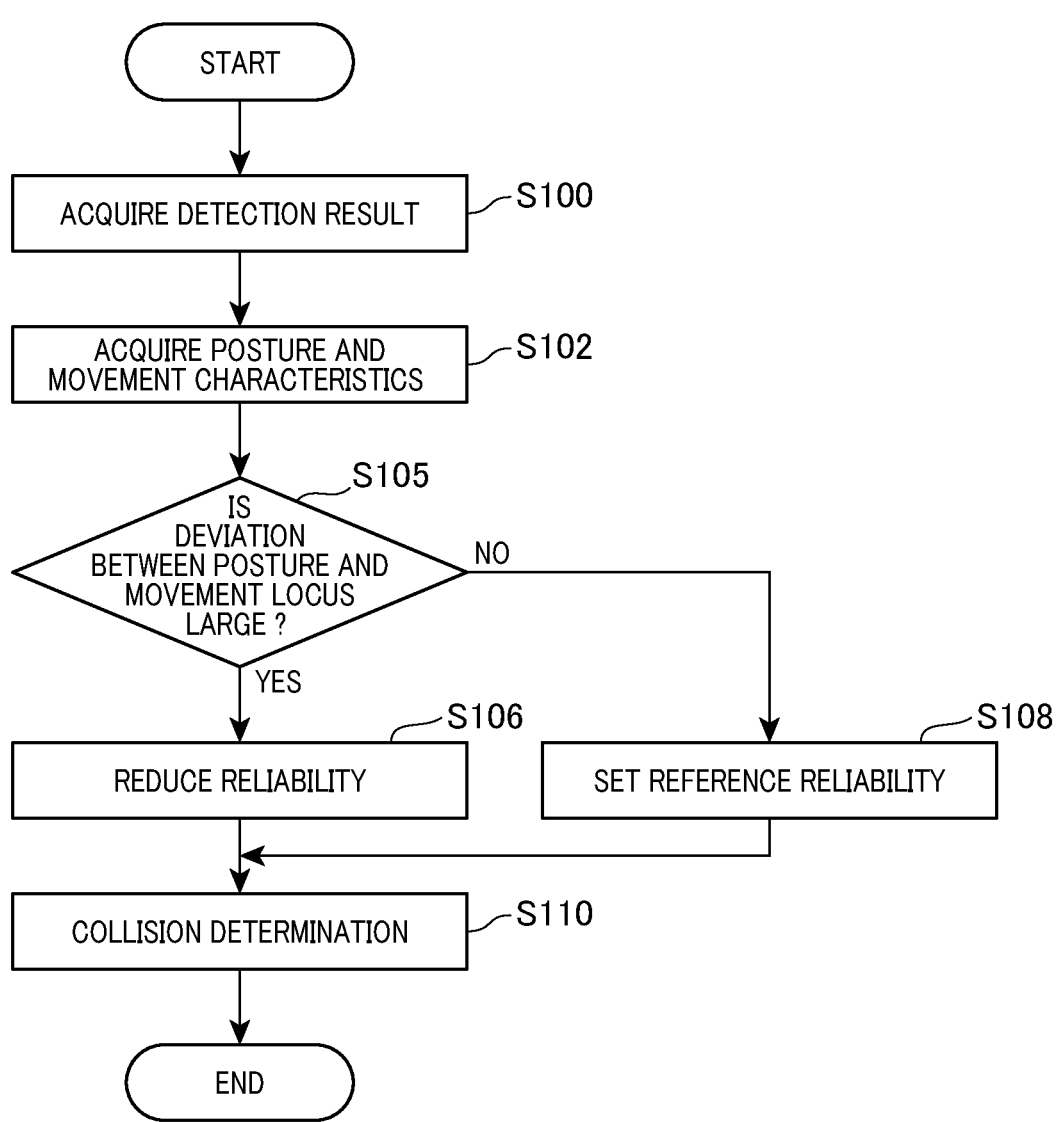
FIG. 5 is a flowchart showing a collision determination process executed by a collision determination apparatus according to a second embodiment.

The collision determination apparatus according to the second embodiment includes a collision determination program Pr1 stored in the memory 102. The collision determination program Pr1 functions to calculate the movement locus and determine the reliability using the posture and the calculated movement locus. With reference to FIG. 5, an object detecting process executed by a collision determination apparatus 100 according to the second embodiment will be described. A processing routine shown in FIG. 5 is repeatedly executed at predetermined intervals, for example, every few milliseconds, after the control system of the vehicle 50 is activated or a start switch is turned ON. The CPU 101 executes the collision determination program Pr1, thereby executing the process flow shown in FIG. 5. In the following description, process steps similar to those executed by the collision determination apparatus 100 according to the first embodiment are applied with the same reference numbers as those in the first embodiment and the detailed explanation will be omitted.

Figure 6:
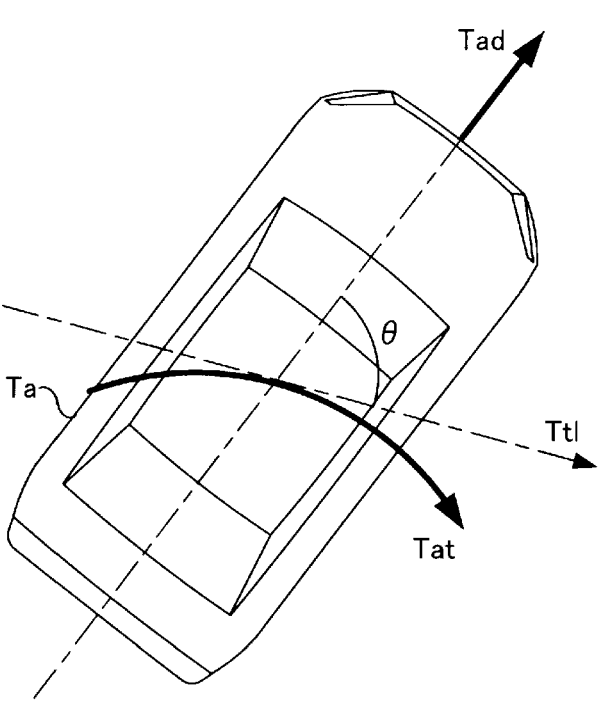
FIG. 6 is an explanatory diagram showing a procedure of determining a reliability by using a posture and a movement locus of the object.

The CPU 101 acquires detection result of the object Ta, as an object to be determined whether a collision risk is present, detected by the camera 20 and the millimeter wave radar 21 via the input-output interface 103 (step S100). The CPU 101 acquires the posture and the movement characteristics of the object Ta (step 5102) by using the acquired detection result. The movement characteristics are the information indicating features of the operation and the behavior of the object Ta over time. According to the present embodiment, the movement locus of the object Ta is acquired as the movement characteristics of the object Ta. The movement locus is calculated by using the speed and the posture of the object. For example, the velocity vector is acquired with an extrapolation using the acquired speed, location and major direction of the object Ta assuming that it is a uniform motion, thereby calculating the movement locus, or the movement locus is calculated with an extrapolation assuming that it is a uniform motion. Alternatively, the movement locus is calculated with a known estimation method such as a least square method, a random sample consensus (RANSAC) method and a least median square (LEMEDS) using the movement history of the object Ta. For example, as shown in FIG. 6, the movement locus Tat of the object Ta in the local coordinate of the vehicle 50.

The CPU 101 determines the posture of the object Ta, that is, determines whether a deviation between the major direction Tad and the movement locus is larger than a predetermined determination value (step S105). Specifically, the CPU 101 determines whether a angle θ formed between the major direction Tad as a current direction of the object Ta and the tangential line Tt1 of the movement locus Tat is larger than a predetermined angle θr, that is, determines whether it is θ>θr. The predetermined determination angle θr may be from 30° to 40°, when determining more strictly, the angle θ may be from 20° to 30° and when determining with a relaxed condition, the angle θ may be from 40° to 50°

The CPU 101, when determined that the angle is θ>θr, that is, the deviation between the posture of the object Ta and the movement locus Tat is larger than the predetermined determination value (step S104: Yes), reduces the reliability (step S106). The CPU 101 executes the collision determination process (step S110) to determine whether a collision risk is present between the object Ta and the vehicle 50 using the determined reliability, determine the driving assist level, transmit the command signal to the driving assist control execution unit 30 and terminates the process. The CPU 101, when determined that the angle is not θ>θr, that is, the deviation between the posture of the object Ta and the movement locus Tat is smaller than the predetermined determination value (step S104: No), sets the reliability to be the reference reliability (step S108). The CPU 101 executes the collision determination process (step S110) to determine whether a collision risk is present between the object Ta and the vehicle 50 using the determined reliability, determine the driving assist level, transmit the command signal to the driving assist control execution unit 30, and terminates the process.

According to the collision determination apparatus 100 of the above-described second embodiment, since the posture of the object Ta and the movement characteristics of the object Ta, in particular, the movement locus Tat of the object are utilized to determine the reliability of the movement characteristics, the individual differences of the detection elements and the environmental influence are suppressed or excluded, thereby improving the collision determination accuracy. Specifically, in the case where the angle θ formed between the current major direction Tad of the target Ta and the tangent line Tt1 of the movement locus Tat at the current location is larger than the determination angle θr, the reliability of the movement locus is reduced. Also, in the case where the angle θ formed between the current major direction Tad of the target Ta and the tangent line Tt1 at the current location is smaller than or equal to the determination angle θr, it is determined that the movement locus Tat satisfies the reliability. As a result, even in a case where the individual differences of the detection elements and the environmental influence influence the collision determination apparatus 100, with the reliability as an index, it can be determined whether a collision risk is present based on the determination level depending on the reliability. Further, a level of the driving assist operation can be set depending on the reliability such that an erroneous determination and execution of unnecessary driving assist process are reduced, thereby improving the collision determination accuracy.

Third Embodiment

A collision determination apparatus according to the third embodiment differs from the collision determination apparatus 100 of the first embodiment in which the velocity vector V of the object Ta is used and the collision determination apparatus 100 of the second embodiment in which the movement locus Tat of the object Ta is used, in that a speed acquired using the detection results of a plurality of detection units is used for the movement characteristics of the object Ta when determining the reliability. Since other configurations of the present embodiment are the same as those in the collision determination apparatuses 100 according to the first and second embodiments, the same reference numbers are applied to the same configuration and the detailed explanation will be omitted.

Figure 7:
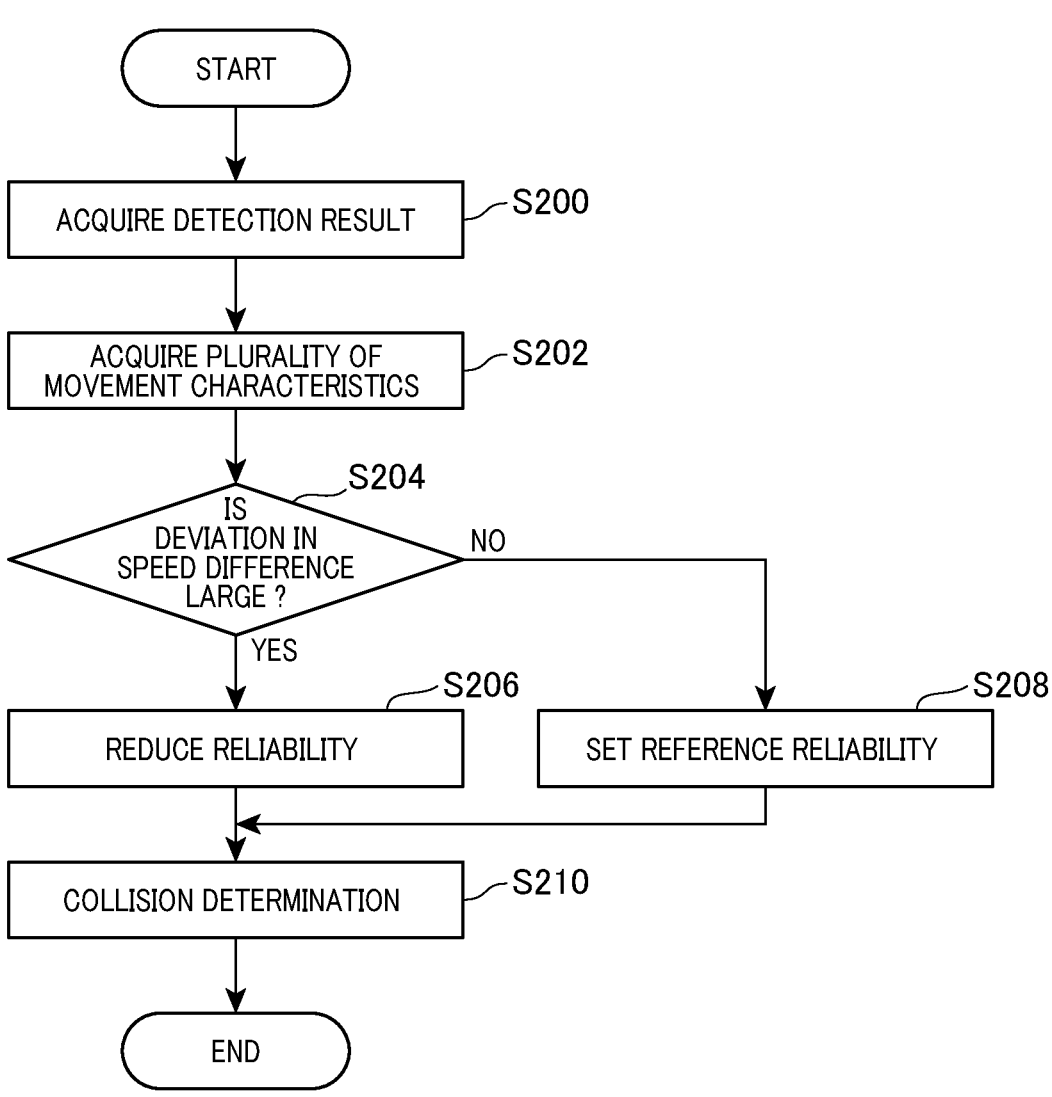
FIG. 7 is a flowchart showing a collision determination process executed by a collision determination apparatus according to a third embodiment.

The collision determination apparatus according to the third embodiment includes a collision determination program Pr1 stored in the memory 102. The collision determination program Pr1 functions to determine the reliability in accordance with the posture and the speed acquired using the detection result of a plurality of detection units. With reference to FIG. 7, an object detecting process executed by a collision determination apparatus 100 according to the third embodiment will be described. A processing routine shown in FIG. 7 is repeatedly executed at predetermined intervals, for example, every few milliseconds, after the control system of the vehicle 50 is activated or a start switch is turned ON. The CPU 101 executes the collision determination program Pr1, thereby executing the process flow shown in FIG. 7. In the following description, process steps S206, S208 and S210 which are similar to those executed by the collision determination apparatus 100 according to the first embodiment are applied with the same reference numbers as those in the first embodiment and the detailed explanation will be omitted.

Figure 8:
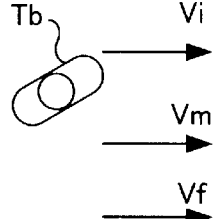
FIG. 8 is an explanatory diagram showing a procedure of determining a reliability by using a difference between a plurality of speeds of objects acquired using detection results of a plurality of different types of detection units.
Figure 8:
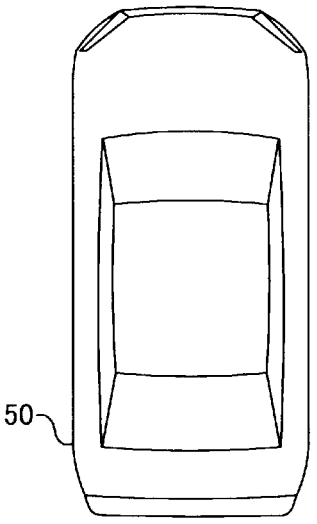

The CPU 101 acquires detection result of the object Tb, as an object to be determined whether a collision risk is present, detected by the camera 20 and the millimeter wave radar 21 via the input-output interface 103 (step S200). According to the present embodiment, a pedestrian is regarded as an object Tb. The CPU 101 acquires a plurality of movement characteristics of the object Tb (step S202) using the acquired detection result. The movement characteristics indicate feature of behavior of the object Tb over time. According to the present embodiment, the movement characteristics is a speed of the object Tb. Specifically, a plurality of speeds acquired using detection result of a plurality of different types of detection units are acquired as the movement characteristics of the present embodiment. The different types of detection units also refer to different types of detection methods of the object Tb, including an imaging method, a millimeter wave radar radiation method, an infrared light emission method, for example. According to the present embodiment, as shown in FIG. 8, as a plurality of movement characteristics, a camera speed Vi acquired using a captured image as a detection result of the camera 20 and a millimeter wave radar speed Vm acquired using reflection point group as a detection result of the millimeter wave radar 21 are used. Further, a fusion speed Vf may be used in which a detection result of the camera 20 and a detection result of the millimeter wave radar 21 are combined.

The CPU 101 determines whether speeds detected using a plurality of detection units, that is, a deviation between the camera speed Vi and the millimeter wave radar speed Vm is large (S204). Specifically, the process determines whether a speed difference Vm between the camera speed Vi and the millimeter wave radar speed Vm is larger than a predetermined speed difference determination value Vdr. The predetermined speed difference determination value Vdr may be set, for example, to be larger than or equal to 10 km/h, or may be set to be 5 km/h for more strict determination or may be set to be 15 km/h for more relaxed determination.

The CPU 101, when determined that the speed difference Vd corresponding to a plurality of detection units is larger than the predetermined speed difference determination value Vdr, that is, Vd>Vdr (step S204: Yes), reduces the reliability (step S206). The CPU 101 executes the collision determination process (S210) to determine whether a collision risk is present between the object Tb and the vehicle 50 using the determined reliability and determine the driving assist level, transmits the command signal to the driving assist control execution unit 30 and terminates the present process routine. The CPU 101, when determined that the speed difference Vd corresponding to a plurality of detection units is smaller than or equal to the predetermined speed difference determination value Vdr, that is not, Vd>Vdr (step S204: No), sets the reliability to be the reference reliability (S208). The CPU 101 executes the collision determination process (step S210) to determine whether a collision risk is present between the object Ta and the vehicle 50 using the determined reliability and determine the driving assist level, transmits the command signal to the driving assist control execution unit 30 and terminates the present processing routine.

According to the collision determination apparatus 100 of the third embodiment, since the movement characteristics of the object Tb, especially a plurality of speeds of the object Tb calculated using the detection results acquired by a plurality of different types of detection units, the camera speed Vi and the millimeter wave radar speed Vm are utilized to determine the reliability of the movement characteristics, the individual differences of the detection elements and the environmental influence are suppressed or excluded, thereby improving the collision determination accuracy. Specifically, in the case where the speed difference between the camera speed Vi of the object Tb and the millimeter wave radar speed Vm is larger than the predetermined determination value Vdr, the reliability of the movement characteristics, that is, the camera speed Vi and the millimeter wave radar speed Vm is reduced, and in the case where the speed difference between the camera speed Vi of the object Tb and the millimeter wave radar speed Vm is smaller than or equal to the predetermined determination value Vdr, the process determines that the movement characteristics, that is, the camera speed Vi and the millimeter wave radar speed Vm satisfy the reference reliability. As a result, even in a case where the individual differences of the detection elements and the environmental influence influence the collision determination apparatus 100, with the reliability as an index, it can be determined whether a collision risk is present based on the determination level depending on the reliability. Further, a level of the driving assist operation can be set depending on the reliability such that an erroneous determination and execution of unnecessary driving assist process are reduced, thereby improving the collision determination accuracy.

Other Embodiments (1) According to the above-described embodiments, the reliability is determined regardless of the types of the objects Ta and Tb. However, the reliability may not be determined depending on the types of the objects Ta and Tb. For example, when the object Ta is a vehicle, a motor cycle or a bicycle, the above-described reliability is determined, and when the object is a specific object, for example, a pedestrian, the reliability may not be determined. Generally, it is difficult to determine the major direction Tad for a pedestrian compared to that of the vehicle. Hence, an accuracy for determining a deviation between the major direction Tad and a direction of the speed, or the tangent line Tt1 of the movement locus Tat may be lowered. In this respect, in the case where the object Tb is a pedestrian, without determining the reliability, lowering of the collision determination accuracy can be reduced or the collision determination accuracy can be prevented from being lowered.

(2) According to the above-described embodiments, the camera 20, the millimeter wave radar 21 and the LIDAR 22 mounted on the vehicle 50 as detection units are exemplified. However, detection units mounted on other vehicles as the object Ta may be utilized. In this case, the detection results detected by the detection units mounted on other vehicles can be received via the inter-vehicle communication or the road-vehicle communication, and the movement characteristics such as the speed and the posture of other vehicle can be acquired using the received detection result. Also, individual differences and detection errors may occur in the detection units mounted on other vehicles, and detection errors due to communication delay may occur. In contrast, according to the above-described embodiments, in the case where the reliability is determined, the individual differences and the detection errors can be reduced or eliminated.

(3) According to the above-described embodiments, the orientation may be corrected relative to the own vehicle using the output result of the yaw rate sensor 25, whereby the positional relationship (posture) with the object Ta. In this case, the detection accuracy of the speed of the object Ta may be further improved.

(4) According to the above-described embodiments, the CPU 101 executes the collision determination program Pr1, thereby achieving the collision determination apparatus 100 in which the reliability of the movement characteristics is determined using the postures of the objects Ta and Tb and the movement characteristics, or the reliability of the movement characteristics is determined using a plurality of speed differences as a plurality of movement characteristics of the objects Ta and Tb acquired using the detection results of a plurality of different detection units. However, the collision determination apparatus 100 may be achieved by a hardware such as a pre-programmed integrated circuit or a discrete circuit. The control unit and method thereof in the above-described embodiments may be accomplished by a dedicated computer constituted of a processor and a memory programmed to execute one or more functions embodied by computer programs. Alternatively, the control unit and method thereof disclosed in the present disclosure may be accomplished by a dedicated computer provided by a processor configured of one or more dedicated hardware logic circuits. Further, the control unit and method thereof disclosed in the present disclosure may be accomplished by one or more dedicated computer where a processor and a memory programmed to execute one or more functions, and a processor configured of one or more hardware logic circuits are combined. Furthermore, the computer programs may be stored, as instruction codes executed by the computer, on a computer readable non-transitory tangible recording media.

The present disclosure is described in accordance with the embodiments and modifications. The above-described embodiments of the invention is to readily understand the present disclosure and does not limit the present disclosure. The present disclosure may be appropriately changed and improved without departing from the sprit thereof or the scope of claims and may incudes equivalents thereof. For example, embodiments corresponding to technical features of respective embodiments indicated in the summary section and the technical features in the modification examples are appropriately replaced or combined in order to solve a part of or all of the above-described issues or to achieve a part of or all of the above-described effects and advantages. The technical features can be appropriately removed unless the technical features thereof are described as necessary in the present specification.

(Conclusion)

As a first aspect, a collision determination apparatus is provided. The collision determination apparatus according to the first aspect is provided with an acquiring unit that acquires movement characteristics of an object to be determined whether a collision risk is present; and a reliability determination unit that calculates a movement locus of the object using the acquired movement characteristics and determines a reliability of the calculated movement locus of the object.

According to the collision determination apparatus of the first aspect, influence of individual difference of the detection units and an environmental influence is capable of being suppressed or eliminated to improve the accuracy of the collision determination.

As a second aspect, a collision determination apparatus is provided. The collision determination apparatus according to the second aspect is provided with an acquiring unit that acquires movement characteristics of an object to be determined whether a collision risk is present using a detection result acquired from a plurality of types of detection units; and a reliability determination unit that determines a reliability of the movement characteristics. The reliability determination unit determines the reliability to be low when a difference of speeds between objects corresponding to the plurality of types of detection units included in the movement characteristics is larger than a predetermined speed difference.

According to the collision determination apparatus of the second aspect, influence of individual difference of the detection units and an environmental influence is capable of being suppressed or eliminated to improve the accuracy of the collision determination.

As a third aspect, a collision determination method is provided. The collision determination method according to the third aspect is provided with steps of acquiring movement characteristics of an object to be determined whether a collision risk is present; calculating a movement locus of the object using the acquired movement characteristics and determining a reliability of the calculated movement locus.

According to the collision determination method of the third aspect, influence of individual difference of the detection units and an environmental influence is capable of being suppressed or eliminated to improve the accuracy of the collision determination.

As a fourth aspect, a collision determination method is provided. The collision determination method according to the fourth aspect is provided with steps of acquiring movement characteristics of an object to be determined whether a collision risk is present using a detection result acquired from a plurality of types of detection units; and determining a reliability of the movement characteristics to be low when a difference of speeds between objects corresponding to the plurality of types of detection units included in the movement characteristics is larger than a predetermined speed difference.

According to the collision determination method of the fourth aspect, influence of individual difference of the detection units and an environmental influence is capable of being suppressed or eliminated to improve the accuracy of the collision determination. Note that the present disclosure can be achieved as a control program of a collision determination program or a computer readable media that stores the control program.

What is claimed is:

1. A collision predicting apparatus configured to be mounted on a vehicle to predict whether a collision will occur between the vehicle and an object, the collision predicting apparatus comprising:

an acquiring unit that acquires a posture and movement characteristics of an object, the movement characteristics including one or more of a velocity of the object or a movement locus of the object; and a reliability determination unit that determines a reliability of the movement characteristics using the posture and the movement characteristics, wherein the reliability determination unit determines that the reliability is low when one or more of:

a first angle formed between a current direction of the velocity of the object and a travelling direction of the is larger than a first predetermined determination value, or a second angle formed between a current direction of a tangential line of the movement locus of the object and the travelling direction of the object is larger than a second predetermined determination value, wherein the collision predicting apparatus predicts whether the collision will occur between the vehicle and the object using the reliability determined by the reliability determination unit.

2. The collision predicting apparatus according to claim 1, wherein the reliability determination unit does not determine the reliability when the object is a specific object where a type of the object is a predetermined type.

3. The collision predicting apparatus according to claim 1, wherein the collision predicting apparatus includes a determination unit that determines whether a collision risk with the object is present; and the determination unit lowers a level of a collision avoidance assist process, executed by a collision avoidance assist execution unit, for the vehicle.

4. A collision avoidance system comprising:

a collision predicting apparatus including:

an acquiring unit that acquires a posture and movement characteristics of an object to be determined whether a collision risk for a vehicle is present with respect to the object, the movement characteristics including one or more of a speed of the object or a movement locus of the object;

a reliability determination unit that determines a reliability of the movement characteristics using the posture and the movement characteristics acquired by the acquiring unit in which the reliability determination unit determines that the reliability is low when one or more of:

a first angle formed between a direction of the speed at a current location of the object and a current direction of the object determined using the posture is larger than a first predetermined determination value, or a second angle formed between a direction of a tangential line of the movement locus at the current location of the object and the current direction of the object determined using the posture is larger than a second predetermined determination value; and a determination unit that predicts whether a collision risk with the object is present using the reliability determined by the reliability determination unit, wherein the determination unit lowers a level of a collision avoidance assist process of the vehicle executed by a collision avoidance assist execution unit.

5. A collision predicting method comprising steps of:

acquiring a posture and movement characteristics of an object to be determined whether a collision risk for a vehicle is present with respect to the object, the movement characteristics including one or more of a speed of the object or a movement locus of the object;

determining a reliability of the movement characteristics using the acquired posture and the movement characteristics in which it is determined that the reliability is low when one or more of:

a first angle formed between a direction of the speed at a current location of the object and a current direction of the object determined using the posture is larger than a first predetermined determination value, or a second angle formed between a direction of a tangential line of the movement locus at the current location of the object and the current direction of the object determined using the posture is larger than a second predetermined determination value; and predicting whether a collision will occur between the vehicle and the object using the reliability.

* * * * *